(12) United States Patent
Takahashi

(10) Patent No.: US 6,325,653 B1
(45) Date of Patent: Dec. 4, 2001

(54) TERMINAL CONNECTING APPARATUS FOR STORAGE DEVICE

(75) Inventor: Seiji Takahashi, Tokyo-to (JP)

(73) Assignee: Kabushiki Kaisha Yokowo, Tokyo (JP)

( * ) Notice: Subject to any disclaimer, the term of this patent is extended or adjusted under 35 U.S.C. 154(b) by 0 days.

(21) Appl. No.: 09/457,681

(22) Filed: Dec. 9, 1999

(30) Foreign Application Priority Data

Jul. 15, 1999 (JP) .................................................. 11-201178
Sep. 9, 1999 (JP) .................................................. 11-255184

(51) Int. Cl.[7] ................................................ H01R 13/15
(52) U.S. Cl. ............................................................. 439/260
(58) Field of Search ..................................... 439/260, 259, 439/261, 267, 630

(56) References Cited

U.S. PATENT DOCUMENTS

| | | | | |
|---|---|---|---|---|
| 4,874,323 | * | 10/1989 | Shibano ................................. | 439/260 |
| 4,961,710 | * | 10/1990 | Komatsu ................................ | 439/267 |
| 5,012,078 | * | 4/1991 | Pernet .................................... | 235/441 |
| 5,290,174 | * | 3/1994 | Woratyla et al. ...................... | 439/59 |
| 5,594,622 | * | 1/1997 | Hosoya et al. ........................ | 361/686 |
| 5,690,281 | * | 11/1997 | Ikeya et al. ........................... | 439/268 |
| 5,829,997 | * | 11/1998 | Okano et al. ......................... | 439/310 |
| 6,089,895 | * | 7/2000 | Komatsu ................................ | 439/260 |
| 6,102,723 | * | 8/2000 | Kusakabe et al. ..................... | 439/267 |

* cited by examiner

*Primary Examiner*—Gary Paumen
*Assistant Examiner*—Phuongchi Nguyen
(74) *Attorney, Agent, or Firm*—Dickstein Shapiro Morin & Oshinsky LLP

(57) ABSTRACT

An oscillating member 55 is designed so that the other end side 58 is pressed by an inserted-side end portion 12 of a storage device 1 to oscillate one end side 57 toward the storage device 1 with the insertion of the storage device 1 into a frame 3. Since the other end portion 42 of a spring connector 4 always resiliently contacts a circuit terminal portion 20 by the function of a coil spring 44 regardless of the movement of the spring connector 4 toward the storage device 1, a terminal portion 10 of the storage device 1 is electrically connected to a circuit terminal portion 20 by the conductive spring connector 4. Thus, the terminal portions 10 of the storage device 1 and the spring connector 4 hardly rub against each other to establish the electrical connection between the terminal portion 10 of the storage device 1 and the circuit terminal portion 20.

19 Claims, 16 Drawing Sheets

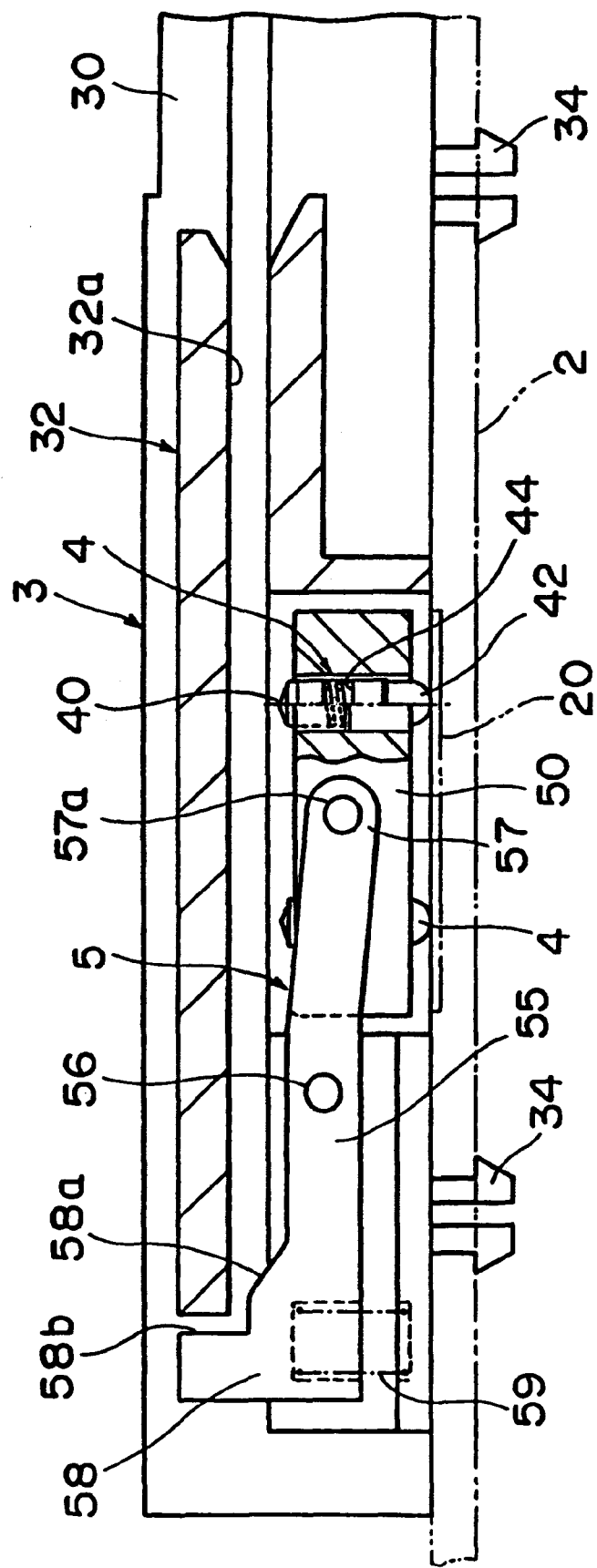
F I G. 1

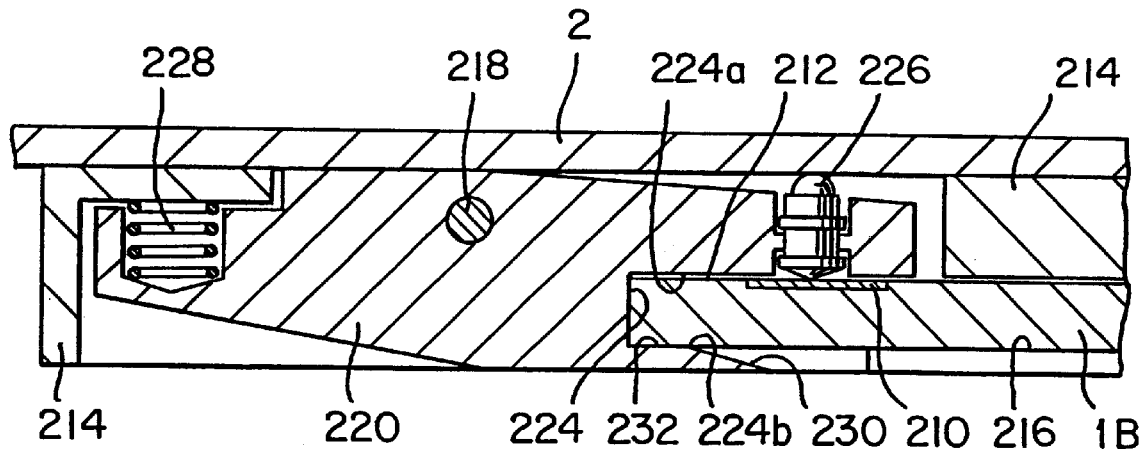
F I G. 13
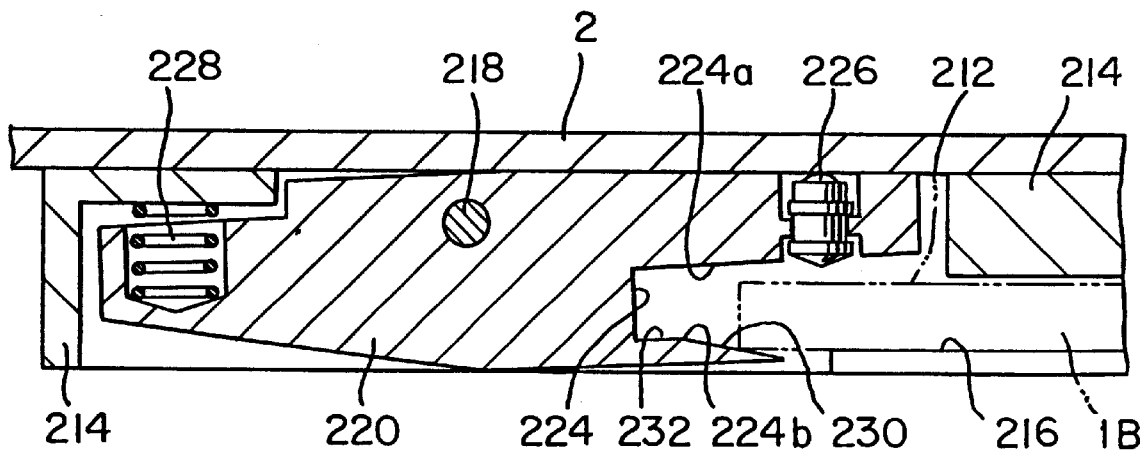
F I G. 14

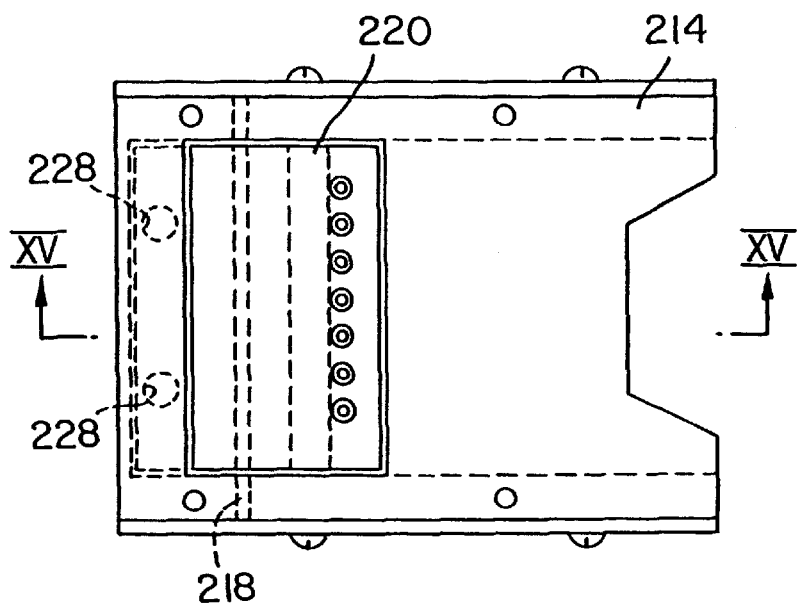
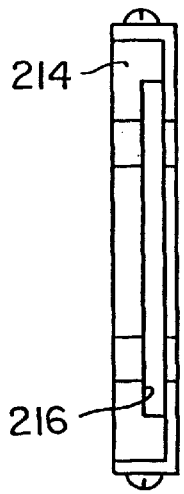
FIG. 15a  FIG. 15b
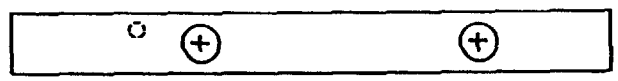
FIG. 15c
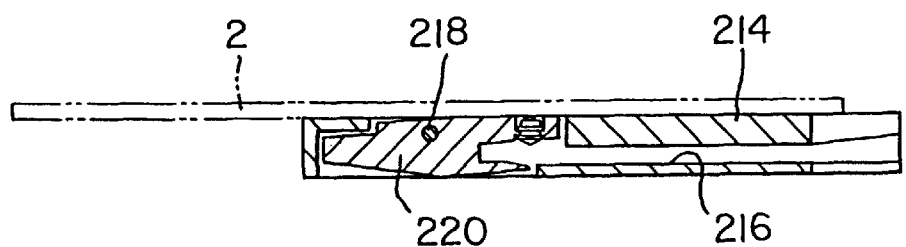
FIG. 16

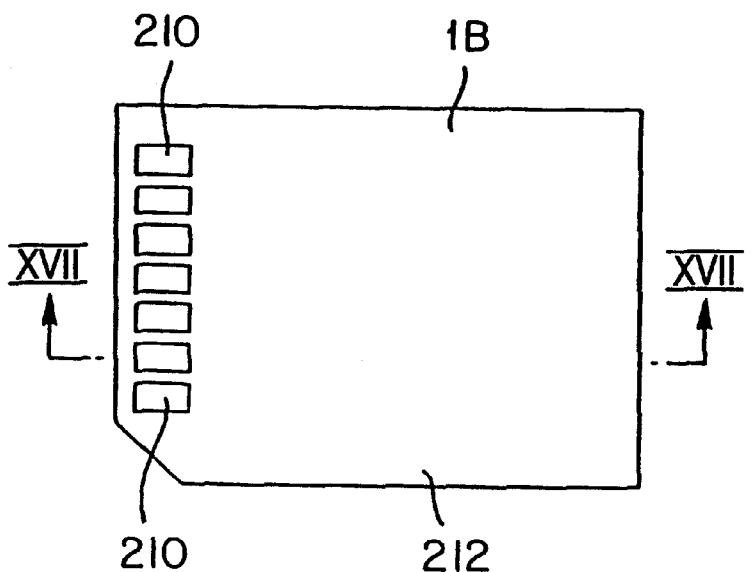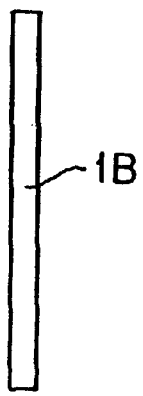
FIG. 17a  FIG. 17b
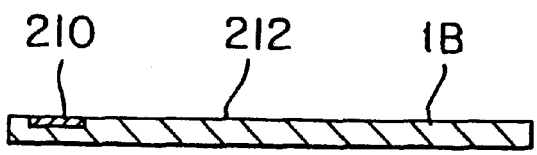
FIG. 17c

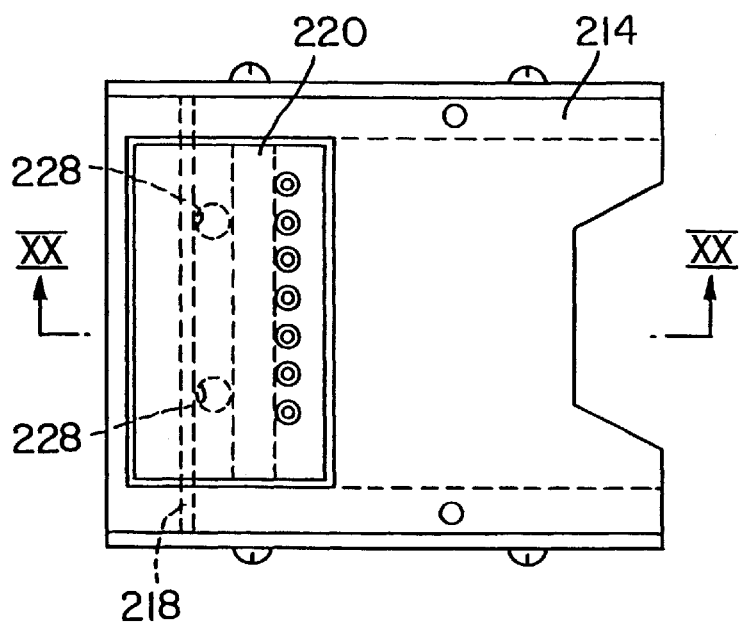
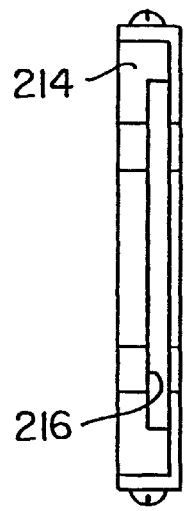
FIG. 20a   FIG. 20b
FIG. 20c
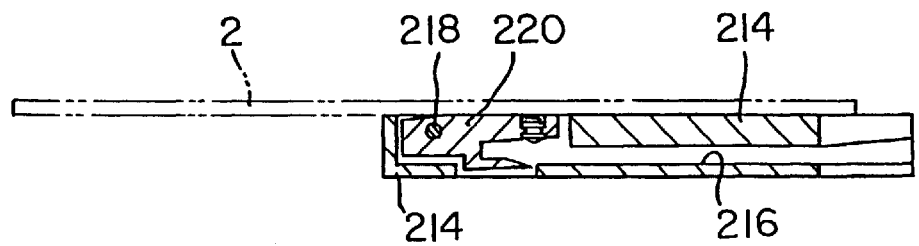
FIG. 21

TERMINAL CONNECTING APPARATUS FOR STORAGE DEVICE

BACKGROUND OF THE INVENTION

1. Field of the Invention

The present invention relates generally to a terminal connecting apparatus for a storage device. More specifically, the invention relates to a terminal connecting apparatus for electrically connecting a terminal portion of a storage device, such as an IC card, to a predetermined circuit terminal portion or the like.

2. Description of the Related Art

In recent years, storage media generally called memory cards for use in the transferring of money, the send and receive of information and so forth, and apparatuses for writing/reading in/out of such storage media have been developed. Such an apparatus for writing/reading in/out of a storage device uses a terminal connecting apparatus for electrically connecting a terminal portion (for input/output) of the storage device to a predetermined circuit terminal portion.

A conventional example of such a terminal connecting apparatus for a storage device is shown in FIGS. 22 and 23. In FIG. 22, the terminal connection apparatus for a storage device comprises a frame 3, provided on a circuit substrate 2, for receiving a substantially plate-shaped storage device 1, and a connector 8 provided in the frame 3. As shown in FIG. 23, the storage device 1 has a plurality of terminal portions 10 (see FIG. 22), and the circuit substrate 2 has a plurality of circuit terminal portions 20, each of which corresponds to a corresponding one of the terminal portions 10 of the storage device 1.

The connector 8 has a plurality of conductive plate springs 80. Each of the plate springs 80 has a contact protruding portion 82 corresponding to a corresponding one of the terminal portions 10 of the storage device 1, and a fixed end portion 84 soldered to a corresponding one of the circuit terminal portions 20 of the circuit substrate 2. As the storage device 1 is inserted into the frame 3, the contact protruding portions 82 of the plate springs 80 are depressed. When the insertion of the storage device 1 is completed, the contact protruding portions 82 of the plate springs 80 resiliently contact the corresponding terminal portions 10 of the storage device 1.

However, in the above described conventional terminal connecting apparatus, each of the terminal portions 10 of the storage device 1 and the corresponding one of the contact protruding portions 82 of the plate springs 80 rub against each other every time the storage device 1 is inserted or ejected, so that the terminal portions 10 and the contact protruding portions 82 tend to be worn away. Therefore, there is a problem in that the durable number of inserting/ejecting operations of the storage device 1 is small.

SUMMARY OF THE INVENTION

It is therefore an object of the present invention to eliminate the aforementioned problems and to provide a terminal connecting apparatus for a storage device, which can improve the durable number of inserting/ejecting operations of the storage device by decreasing the wearing of the terminal portions of the storage device.

In order to accomplish the aforementioned and other objects, according to one aspect of the present invention, there is provided a terminal connecting apparatus for a storage device having a terminal side face, on which a terminal portion is formed, the terminal connecting apparatus comprising: a frame for receiving the storage device; a conductive connecting member having one end portion for contacting the terminal portion of the storage device; and a moving mechanism, mounted on the frame, for moving the one end portion of the connecting member toward the terminal portion of the storage device with the insertion of the storage device into the frame.

According to such a terminal connecting apparatus for a storage device, when the storage device is inserted into the frame, the moving mechanism moves the one end portion of the connecting member toward the terminal portion of the storage device to bring the one end portion of the connecting member into contact with the terminal portion of the storage device. In this case, it is possible to considerably shorten the distance, by which the one end portion of the connecting member slides on the terminal portion of the storage device. Therefore, the one end portion of the connecting member and the terminal portion of the storage device can be electrically connected to each other without substantially rubbing against each other. Therefore, it is possible to considerably improve the durable number of inserting/ejecting operations of the storage device.

In order to surely establish the electrical connection using the connecting member, the connecting member is preferably a spring connector. In this case, the contact pressure applied between the terminal portion of the storage device and the one end portion of the spring connector is gradually increased from zero by the function of the spring until the connection is completed after the one end portion of the spring connector starts to contact the terminal portion of the storage device. Therefore, even if the terminal portion of the storage device and the one end portion of the spring connector slightly rub against each other, the mean contact pressure does not so increase, so that it is possible to decrease the influence on wearing.

The moving mechanism may have an oscillating member which is mounted on said frame so as to be oscillatable about an oscillating axis extending in a direction parallel to said terminal side face of said storage device and perpendicular to an insert-direction of said storage device.

The terminal connecting apparatus may further comprise a circuit substrate, which is mounted on the frame and which has a circuit terminal portion corresponding to the terminal portion of the storage device, and the other end portion of the connecting member may always resiliently contact the circuit terminal portion of the circuit substrate. In this case, since the other end portion of the spring connector always resiliently contacts the circuit terminal portion of the circuit substrate, the terminal portion of the storage device is electrically connected to the circuit terminal portion of the circuit substrate by the spring connector when the storage device is inserted into the frame.

The moving mechanism may have a holding member for holding the connecting member. In addition, the oscillating member may have one end side connected to the holding member, and the other end side corresponding to an inserted-side end portion of the storage device. Moreover, the other end side of the oscillating member may be pressed by the inserted-side end portion of the storage device with the insertion of the storage device into the frame, so that the one end side of the oscillating member can oscillate so as to approach the terminal side face of the storage device.

In this terminal connecting apparatus, the terminal side face of the storage device may have the terminal portion on an inserted-side end portion thereof, and a step portion behind the terminal portion with respect to the insert-direction of the storage device, the step portion having a thickness greater than that of the terminal portion. In addition, the oscillating member may have one end side corresponding to the step portion of the storage device, and the other end side holding the connecting member. Moreover, the one end side of the oscillating member may be pressed by the step portion of the storage device with the insertion of the storage device into the frame, so that the other end side of the oscillating member can oscillate so as to approach the terminal side face of the storage device.

In this case, the terminal connecting apparatus preferably further comprises a resiliently biasing member for biasing the oscillating member in an oscillating direction so that the other end side of the oscillating member leaves the terminal side face of the storage device. Thus, the attitude of the oscillating member can be stably held in a state for allowing the insertion of the storage device.

In addition, an inclined surface for oscillating the oscillating member by the wedge effect is preferably formed on at least one of: (a) the step portion of the storage device, and (b) the one end side of the oscillating member. Thus, it is possible to surely oscillate the oscillating member even if the storage device is inserted by a small force.

The oscillating member may have one end side, on which a recessed portion capable of receiving an inserted-side end portion of the storage device is provided and which holds the connecting member. The recessed portion on the one end side may have one side face, to which the one end portion of the connecting member is exposed, and the other side face, on which an inclined surface extending toward an opening of the recessed portion is formed. The inclined surface of the recessed portion may be pressed by the inserted-side end portion of the storage device with the insertion of the storage device into the frame, so that the one side face of the recessed portion can oscillate so as to approach the terminal side face of the storage device.

Also in this case, the terminal connecting apparatus preferably further comprises a resiliently biasing member for biasing the oscillating member in an oscillating direction so that the one side face of the recessed portion leaves the terminal side face of the storage device. Thus, the attitude of the oscillating member can be stably held in a state for allowing the insertion of the storage device.

In this case, the other side face of the recessed portion of the oscillating member preferably has a parallel surface which is parallel to a corresponding surface of the inserted storage device on an inner side of the inclined surface. Thus, when the inserted-side end portion of the storage device passes over the parallel surface of the recessed portion, the oscillating member does not oscillate, and the oscillating member slides by only a slight distance while the one end portion of the spring connector contacts the terminal portion of the storage device. Thus, by intentionally leaving the slight rubbing between the terminal portion of the storage device and the one end portion of the spring connector, the electrical connection between the contact portions of the terminal portion of the storage device and the one end portion of the spring connector can be surely obtained by wiping.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 1 is a longitudinal section of a principal part of the first preferred embodiment of a terminal connecting apparatus for a storage device according to the present invention, before the storage device (card) is inserted into the terminal connecting apparatus;

FIG. 4a is a partially broken plan view of the terminal connecting apparatus of FIG. 1;

FIG. 4b is a right side view of the terminal connecting apparatus of FIG. 4a;

FIG. 5 is a longitudinal section of the terminal connecting apparatus of FIG. 4a;

FIG. 8a is a side view of an example of a spring connector for use in the terminal connecting apparatus of FIG. 6a;

FIG. 8b is a longitudinal section of another example of a spring connector for use in the terminal connecting apparatus of FIG. 6a;

FIG. 9 is a longitudinal section showing the structure of a spring pin of the terminal connecting apparatus of FIG. 6a;

FIG. 10a is a horizontal section showing an engaging member and a releasing member of the terminal connection apparatus of FIG. 6a;

FIG. 10b is a view along arrow X of FIG. 10a;

FIG. 11a is a longitudinal section of a storage device for use in the terminal connecting apparatus of FIG. 6a;

FIG. 11b is a bottom view of the storage device of FIG. 11a;

FIG. 11c is a left side view of the storage device of FIG. 11a;

FIG. 13 is a longitudinal section of a principal part of the fourth preferred embodiment of a terminal connecting apparatus for a storage device according to the present invention, after the storage device is inserted into the terminal connecting apparatus;

FIG. 14 is a longitudinal section of the principal part of the terminal connecting apparatus of FIG. 13, before the storage device is inserted into the terminal connecting apparatus;

FIG. 15a is a plan view of the terminal connecting apparatus of FIG. 13, wherein a circuit substrate is omitted;

FIG. 15b is a right side view of the terminal connecting apparatus of FIG. 15a;

FIG. 15c is a front view of the terminal connecting apparatus of FIG. 15a;

FIG. 16 is a sectional view taken along line XV—XV of FIG. 15a;

FIG. 17a is a plan view of a storage device for use in the terminal connecting apparatus of FIG. 13;

FIG. 17b is a right side view of the storage device of FIG. 17a;

FIG. 17c is a sectional view of the storage device of FIG. 17a, which is taken along line XVII—XVII of FIG. 17a;

FIG. 20a is a plan view of the terminal connecting apparatus of FIG. 18, wherein a circuit substrate is omitted;

FIG. 20b is a right side view of the terminal connecting apparatus of FIG. 20a;

FIG. 20c is a front view of the terminal connecting apparatus of FIG. 20a;

FIG. 21 is a sectional view taken along line XX—XX of FIG. 20a;

DESCRIPTION OF THE PREFERRED EMBODIMENTS

Referring now to the accompanying drawings, the preferred embodiments of the present invention will be described below. FIGS. 1 through 21 show the preferred embodiments of a terminal connecting apparatus for a storage device according to the present invention.

First Preferred Embodiment

Figure 2:
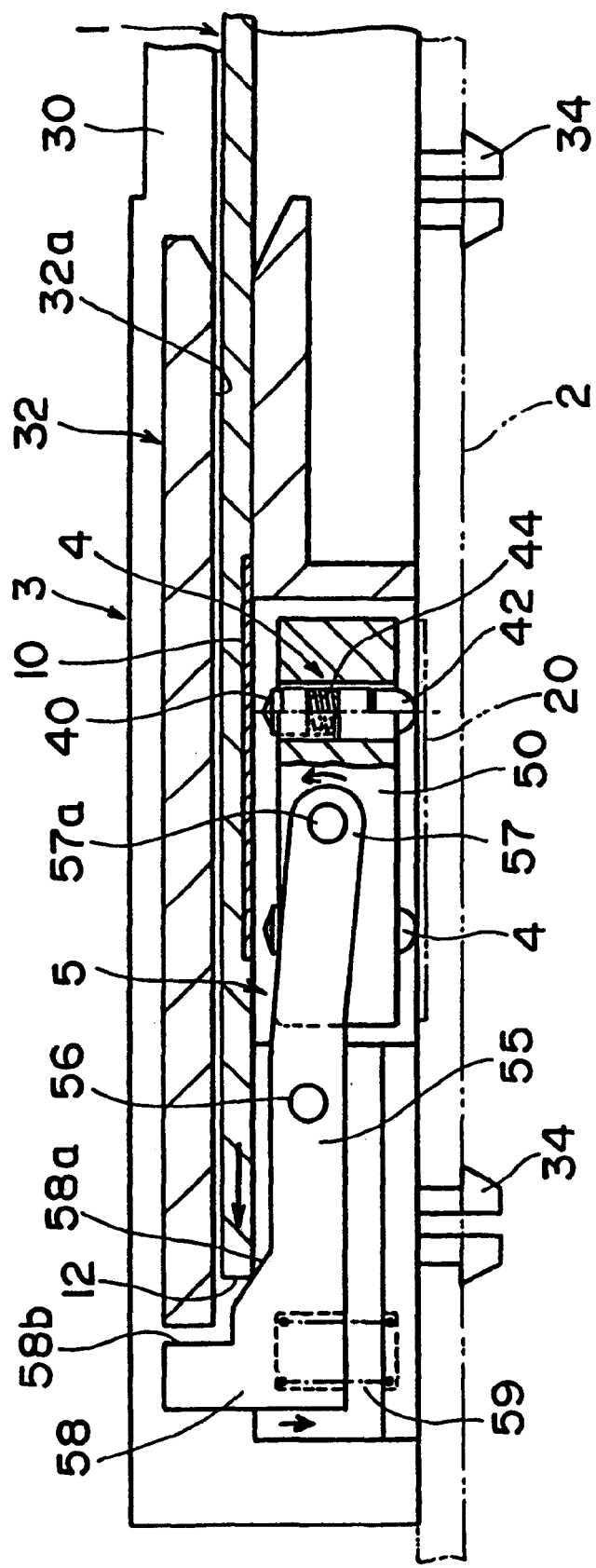
FIG. 2 is a longitudinal section of the principal part of the terminal connecting apparatus of FIG. 1, while the storage device is inserted into the terminal connecting apparatus (before the storage device reaches a predetermined position)
Figure 3:
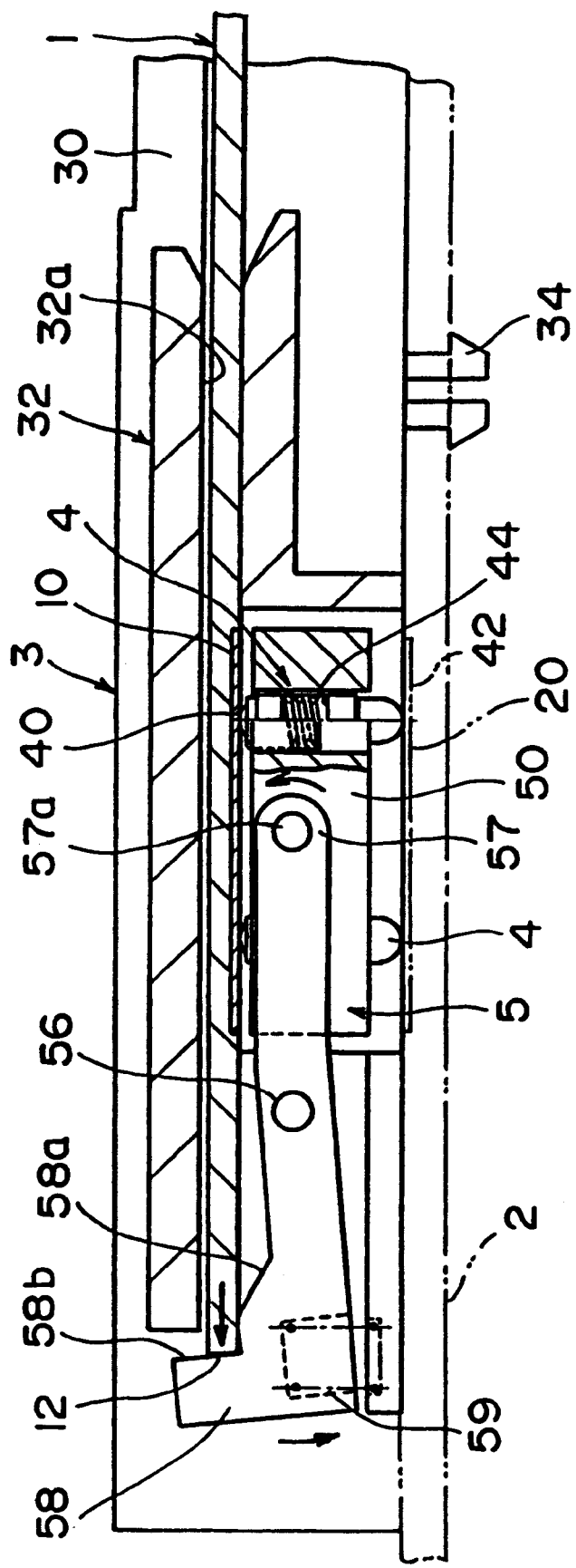
FIG. 3 is a longitudinal section of the principal part of the terminal connecting apparatus of FIG. 1, after the storage device is inserted into the terminal connecting apparatus.

First, referring to FIGS. 1 through 5, the first preferred embodiment of a terminal connecting apparatus for a storage device according to the present invention will be described. FIGS. 1 through 3 are longitudinal views showing a principal part of the first preferred embodiment of a terminal connecting apparatus according to the present invention, and FIGS. 4a, 4b and 5 are views showing the whole construction of the terminal connecting apparatus.

Figures 4A, 4B:
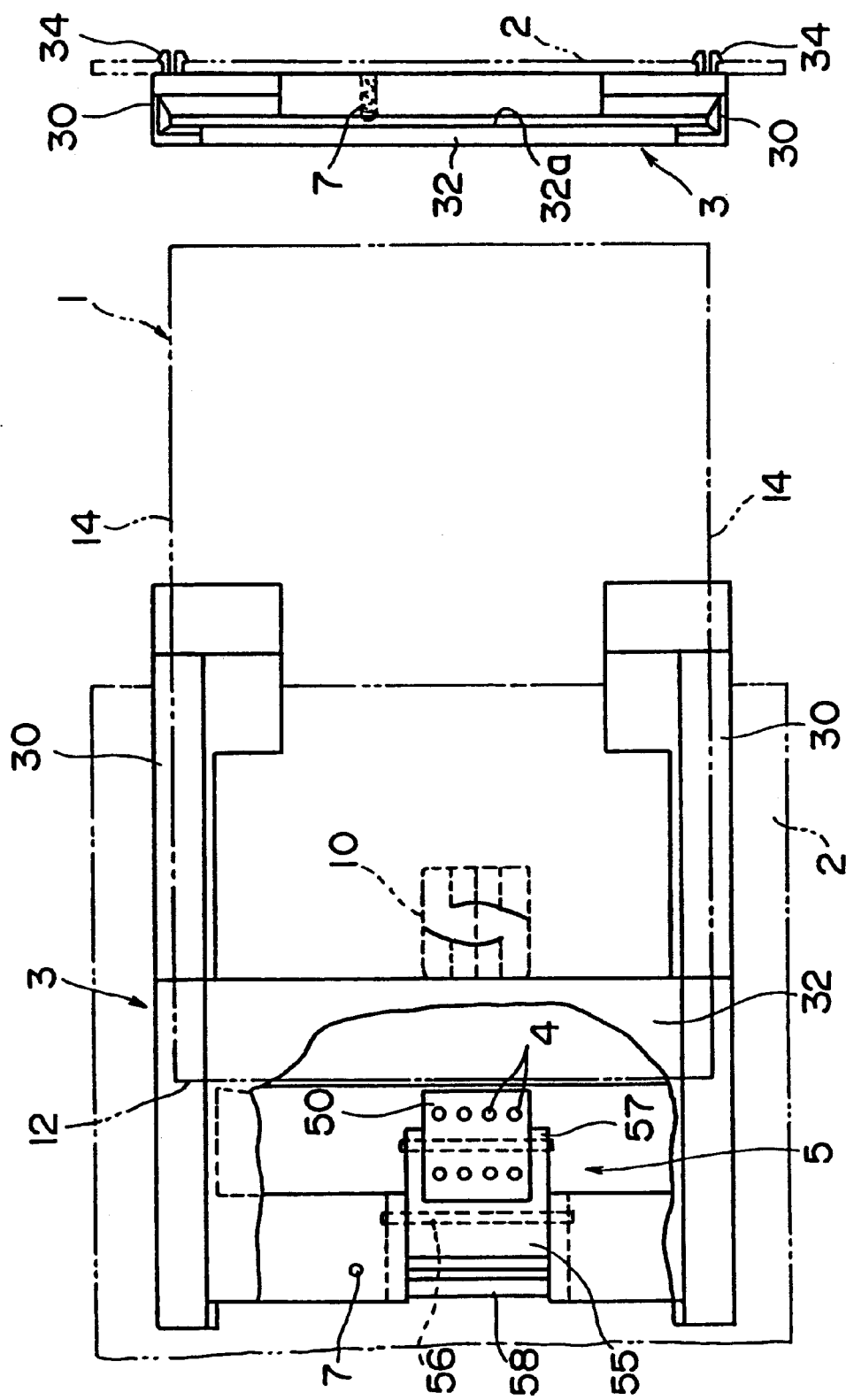
Figure 5:
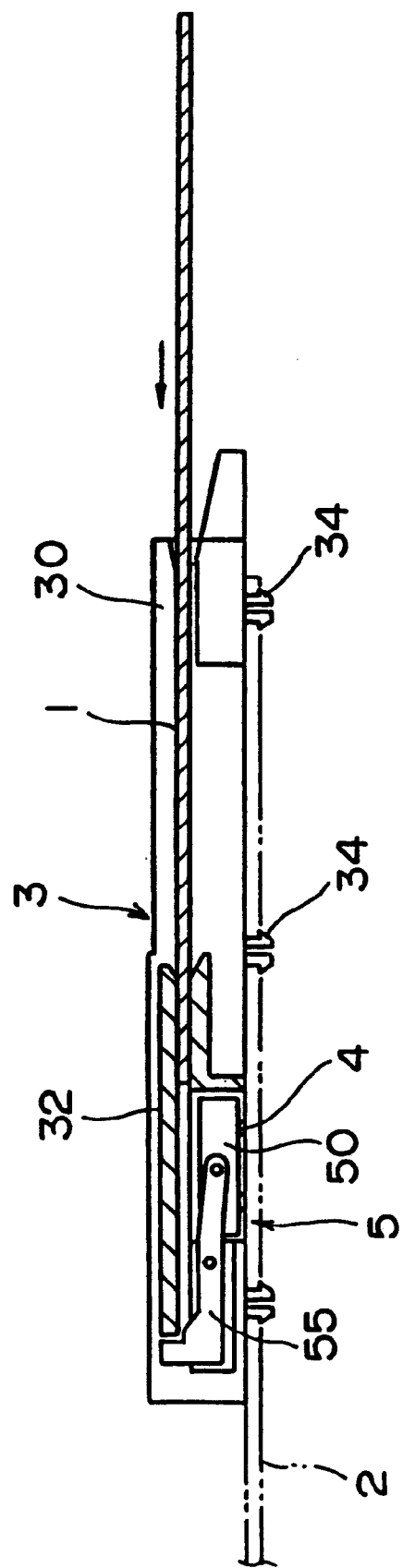

As shown in FIGS. 4a, 4b and 5, the terminal connecting apparatus comprises a frame 3, provided on a circuit substrate 2, for receiving a storage device 1, and a plurality of (8 in this preferred embodiment) conductive spring connectors (connecting members) 4. The frame 3 has a guiding portion 30 for guiding both end portions of the storage device 1, and an inserted portion 32 having an insertion slot 32a for receiving the front end portion (inserted-side end portion) of the storage device 1. Furthermore, reference number 34 denotes a snap member for fixing the circuit substrate 2 to the bottom surface of the frame 3.

As shown in FIG. 2 or 3, the storage device (memory card) 1 for use in this preferred embodiment is a relatively thin, substantially rectangular parallelepiped solid with no moving parts, and the whole storage device 1 is covered with an insulating resin. In addition, the storage device 1 has a terminal side face 12 having a plurality of (8 in this preferred embodiment) terminal portions 10 for input/output (see FIG. 4(a)). Each of the terminal portions 10 is suitably electrically connected to a solid memory circuit or the like which is provided in the storage device 1. The circuit substrate 2 has a plurality of circuit terminal portions 20, each of which corresponds to a corresponding one of the terminal portions 10 of the storage device 1, on the upper surface thereof.

Each of the spring connectors 4 has one end portion 40 for contacting a corresponding one of the terminal portions 10 of the storage device 1, and the other end portion 42 for contacting a corresponding one of the circuit terminal portions 20. In addition, a moving mechanism 5 for moving the one end portions of the spring connectors 4 toward the terminal portions 10 of the storage device 1 with the insertion of the storage device 1 into the frame 3 is provided in the inserted portion 32 of the frame 3.

The moving mechanism 5 has an insulating holding member 50 for holding the spring connectors 4, and an oscillating member 55 mounted on the frame 3 (via an oscillating shaft 56) oscillatably in directions of the thickness of the storage device 1. That is, an axis of the shaft 56 (an oscillating axis) extends in a direction parallel to the terminal side face 12 of the storage device 1 and perpendicular to an insert-direction of the storage device 1.

The oscillating member 55 has one end side 57 connected to the holding member 50 via a pin 57a, and the other end side 58 corresponding to the inserted-side end portion 12 of the storage device 1. The other end side 58 has an inclined surface 58a located in the front of the inserting direction of the storage device 1, and a stop surface 58b located in the rear of the inserting direction of the storage device 1. Between the other end side 58 of the oscillating member 55 and the bottom surface side of the frame 3, an oscillating spring (resiliently biasing member) 59 is provided.

The oscillating member 55 is designed that the one end side 57 oscillates toward the storage device 1 (against the biasing force of the oscillating spring 59) when the other end side 58 is depressed by the inserted-side end portion 12 of the storage device 1 with the insertion of the storage device 1 into the frame 3.

The one end portions 40 of the spring connectors 4 are secured to the holding member 50 of the moving mechanism 5, and the other end portions 42 of the spring connectors 4 are provided on the holding member 50 so as to be reciprocatable toward the circuit terminal portions 20. Moreover, each of the spring connectors 4 has a coil spring 44 for biasing a corresponding one of the other end portions 42 toward a corresponding one of the circuit terminal portions 20.

Furthermore, in FIGS. 4a and 4b, reference number 7 denotes a resilient protruding portion for causing a so-called click sense when the storage device 1 is inserted into or ejected from the inserted portion 32 of the frame 3.

With this construction, the operation and the function of this preferred embodiment will be described below. In this preferred embodiment, when the storage device 1 is inserted into the frame 3, the moving mechanism 5 moves the one end portions 40 of the spring connectors 4 toward the terminal portions 10 of the storage device 1 to bring the one end portions 40 into contact with the terminal portions 10.

Specifically, as shown in FIG. 1, before the storage device 1 is inserted into the frame 3, the oscillating member 55 of the moving mechanism 5 is biased by the function of the oscillating spring 59 so that the one end side 57 oscillates toward the circuit substrate 2. Thus, the one end portions 40 of the spring connectors 4 are arranged so as to be lower than the bottom end of the insertion slot 32a of the frame 3 toward the circuit substrate 2.

Then, as shown in FIG. 2, when the storage device 1 starts to be inserted into the insertion slot 32a of the frame 3, the inserted-side end portion 12 of the storage device 1 contacts the inclined surface 58a of the other end side 58 of the oscillating member 55.

When the insertion of the storage device 1 proceeds, the inclined surface 58a of the other end side 58 is depressed by the inserted-side end portion 12 of the storage device 1 (against the biasing force of the oscillating spring 59), and the one end side 57 starts to oscillate toward the storage device 1. In this state, the one end portions 40 of the spring connectors 4 do not contact the storage device 1.

As shown in FIG. 3, when the insertion of the storage device 1 further proceeds, the inserted-side end portion 12 of the storage device 1 (relatively) passes over the inclined surface 58a of the other end side 58 to butt against the stop surface 58b, so that the insertion of the storage device 1 is completed. In this stage, the one end portions 40 of the spring connectors 4 contact the terminal portions 10 of the storage device 1 (substantially vertically) with the oscillation of the one end side 57 toward the storage device 1.

Then, regardless of such movement of the spring connectors 4 toward the storage device 1, the other end portions 42 of the spring connectors 4 always contact the circuit terminal portions 20 by the function of the coil spring 44, so that the terminal portions 10 of the storage device 1 are electrically connected to the circuit terminal portions 20 by means of the conductive spring connectors 4.

Thus, according to this preferred embodiment, it is possible to considerably shorten the distance, by which the one end portions 40 of the spring connectors 4 slide while contacting the terminal portions 10 of the storage device. Therefore, the terminal portions 10 of the storage device 1 and the spring connectors 4 hardly rub against each other to establish the electrical connection between the terminal portions 10 of the storage device 1 and the circuit terminal portions 20, so that the durable number of inserting/ejecting operations of the storage device 1 can be greatly improved (e.g., to be a hundred thousand or more).

Furthermore, immediately before the insertion of the storage device 1 is completed, the terminal portions 10 of the storage device 1 and the one end portions 40 of the spring connectors 4 can minutely rub against each other. However, this minute rubbing does not substantially cause wearing. If anything, this minute rubbing is effective in the wiping (cleaning) of the contact portions.

In addition, since the spring connectors are used as the connecting members 4 for connecting the terminal portions 10 of the storage device 1 to the circuit terminal portions 20, the contact pressures applied between the terminal portions 10 of the storage device 1 and the circuit terminal portions are gradually increased from zero by the function of the coil springs 44 until the connection is completed after the one end portions 40 of the spring connectors 4 start to contact the terminal portions 10 of the storage device 1. Therefore, even if the terminal portions 10 of the storage device 1 and the one end portions 40 of the spring connectors 4 rub against each other, the mean contact pressure does not so increase, so that it is possible to decrease the influence on wearing.

Second Preferred Embodiment

Referring to FIGS. 6a through 11c, the second preferred embodiment of a terminal connecting apparatus for a storage device according to the present invention will be described below.

First, referring to FIGS. 11a through 11c, the construction of the storage device for use in the second preferred embodiment of a terminal connecting apparatus according to the present invention will be described below.

Figure 11A:
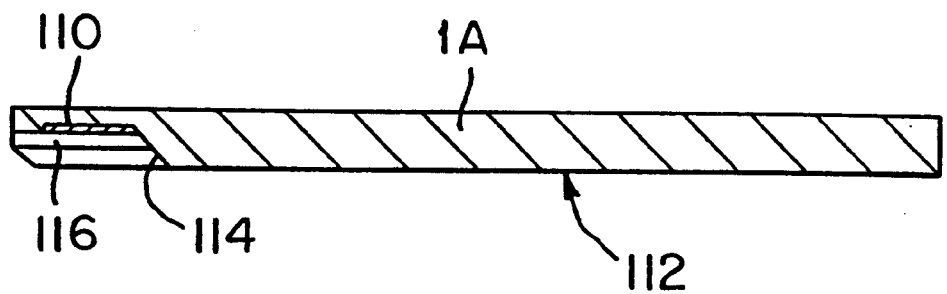
Figure 11B:
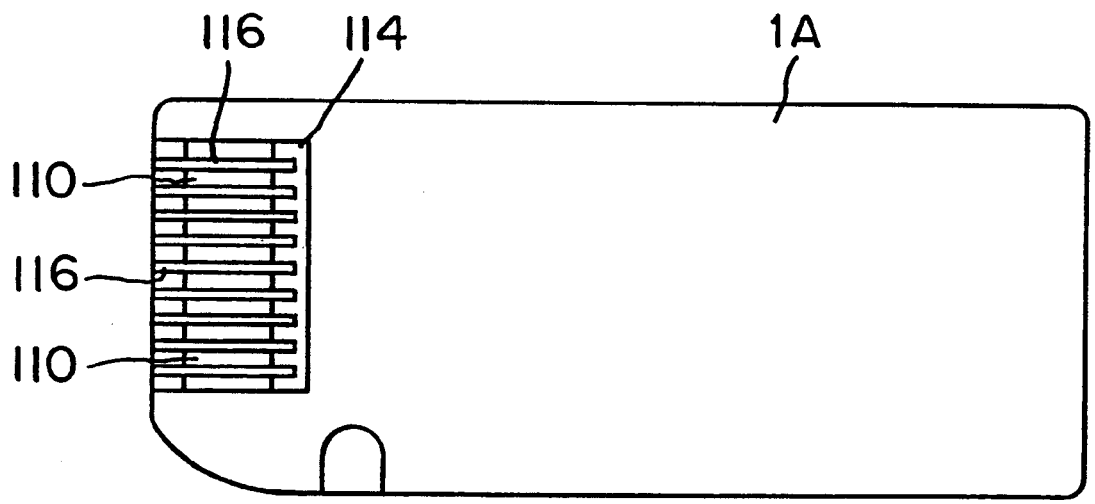
Figure 11C:
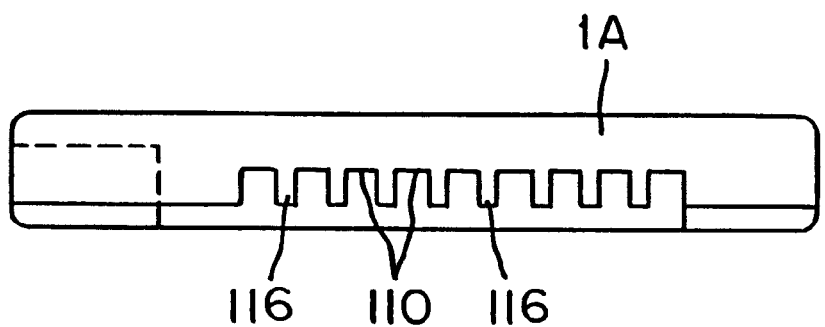

As shown in FIGS. 11a through 11c, the memory storage 1A is a relatively thin, substantially rectangular parallelepiped solid with no moving parts, and the whole storage device 1A is covered with an insulating resin. In addition, the storage device 1A has a terminal side face 112, which has a plurality of terminal portions 110, in the inserted-side portion thereof.

The terminal side face 112 has a step portion 114 thicker than the terminal portions 110, in the rear of the terminal portions 110 with respect to the inserting direction of the storage device 1A. Furthermore, partition walls 116 are provided so as to separate adjacent terminal portions 110. Each of the terminal portions 110 is suitably electrically connected to a solid memory circuit or the like provided in the storage device 1A.

Referring to FIGS. 6a through 10b, the construction of the terminal connecting apparatus in the second preferred embodiment, which uses the storage device 1A, will be described below.

Figure 6A:
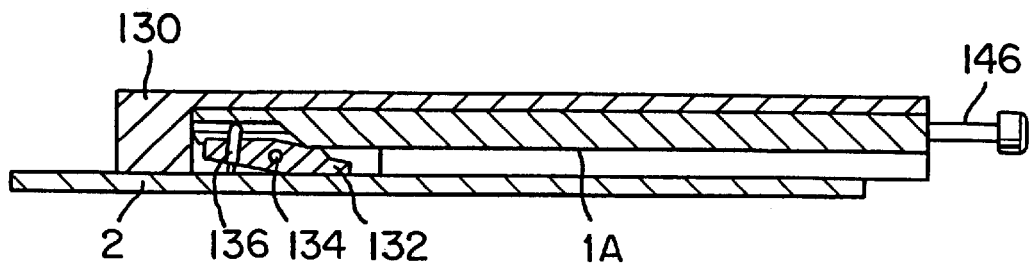
FIG. 6a is a longitudinal section of the second preferred embodiment of a terminal connecting apparatus for a storage device according to the present invention.
Figure 6B:
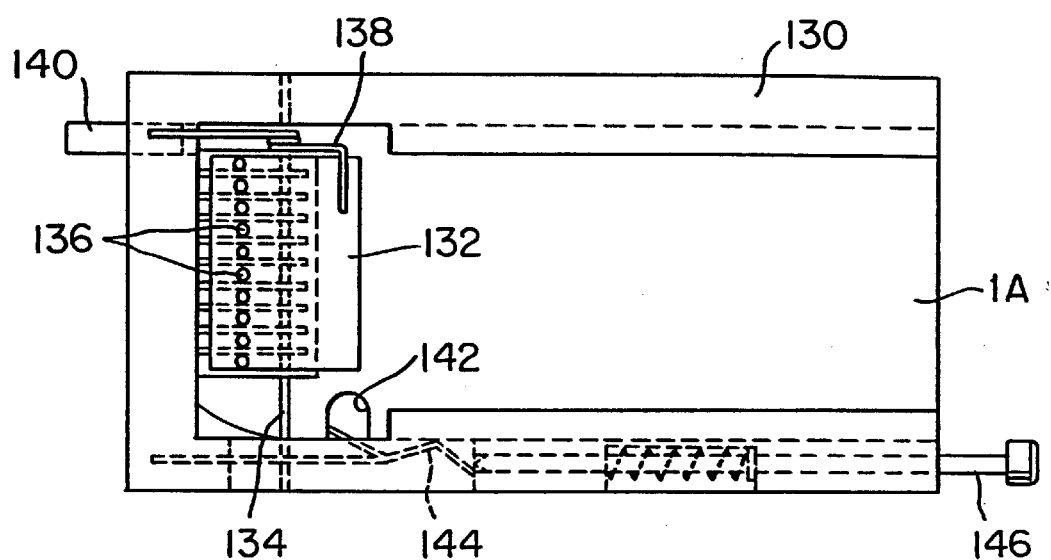
FIG. 6b is a bottom view of the terminal connecting apparatus of FIG. 6b, wherein a circuit substrate is omitted.

First, as shown in FIGS. 6a and 6b, a frame 130 of an insulating material is fixed to a circuit substrate 2. The storage device 1 can be inserted into or ejected from the frame 130 while the terminal side face 112 faces the circuit substrate 2 and while the side of a terminal portion 210 serves as the inserted side. In addition, between the terminal portions 110 of the storage device 1A inserted into the frame 130 and the circuit substrate 2, an oscillating member 132 of an insulating material is oscillatably provided so as to face the circuit substrate 2.

The oscillating member 132 is pivotably supported on an oscillating shaft 134, which is parallel to the terminal side face 112 of the storage device 1A and which is perpendicular to the inserting direction thereof. With the insertion of the storage device 1A, the inclined surface of the step portion 114 of the storage device 1A contacts one end side of the oscillating member 132, and the other end side of the oscillating member 132 oscillates so as to approach the terminal portions 110. In addition, spring connectors 136 are provided on the other end side of the oscillating member 132 so that one end portions thereof elastically contact the terminal portions 110. Moreover, the other end side of the oscillating member 132, on which the spring connectors 136 are provided, is biased by an oscillating spring (resiliently biasing member) 138 in an oscillating direction so as to leave the terminal portions 110 of the inserted storage device 1A.

In addition, the frame 130 is provided with a spring pin 140, which resiliently contacts the inserted-side end surface of the storage device 1A, for biasing the storage device 1A in the ejected direction. Moreover, the frame 130 is provided with an engaging member 144, which engages an engaged recessed portion 142 formed in the storage device 1A when the storage device 1A is inserted into the frame 130, for inhibiting the storage device 1A from moving in the ejected direction, and a releasing member 146 for releasing the engaged recessed portion 142 from the engaging member 144.

Figure 7A:
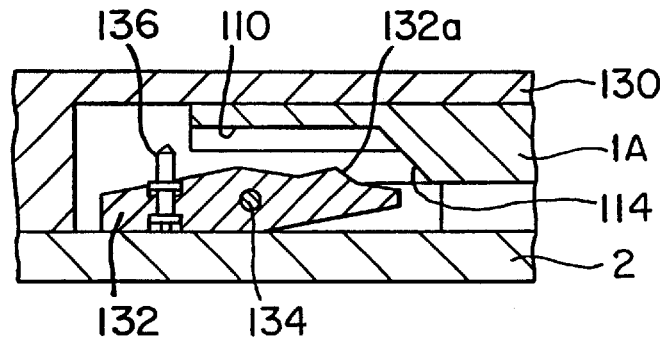
FIG. 7a is a sectional view of a principal part of the terminal connecting apparatus of FIG. 6a, before the storage device reaches a predetermined position.
Figure 7B:
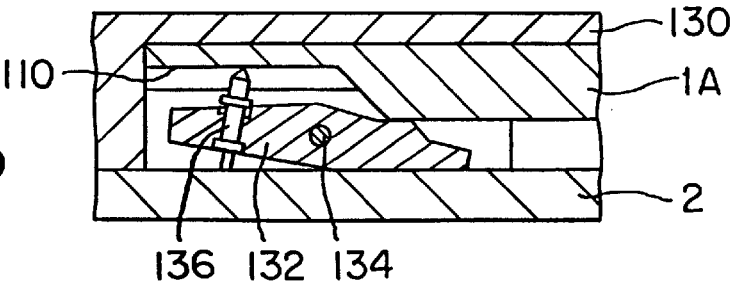
FIG. 7b is a sectional view of the principal part of the terminal connecting apparatus of FIG. 7a, after the storage device is inserted into the terminal connecting apparatus.

Referring to FIGS. 7a and 7b, the operation of the oscillating member 132 will be described below.

As shown in FIG. 7a, before the storage device 1A is inserted into the frame 130 to reach a predetermined position, the oscillating member 132 is biased by the oscillating spring 138 so that the spring connectors 136 leave the terminal portions 110 of the storage device 1A to form a space for allowing the insertion of the storage device 1A.

Then, when the storage device 1A is inserted, the step portion 114 of the storage device 1A contacts a contact portion 132a of an inclined surface provided on the one end side of the oscillating member 132. Then, the oscillating member 132 oscillates against the biasing force of the oscillating spring 138 by the wedge effect between the step portion 114 and the contact portion 132, which are formed of the inclined surface, to be arranged as shown in FIG. 7b. Then, the one end portions of the spring connectors 136 provided on the other end sides of the oscillating member 132 are resiliently brought into contact with the terminal portions 110 to be electrically connected thereto.

Figure 8A:
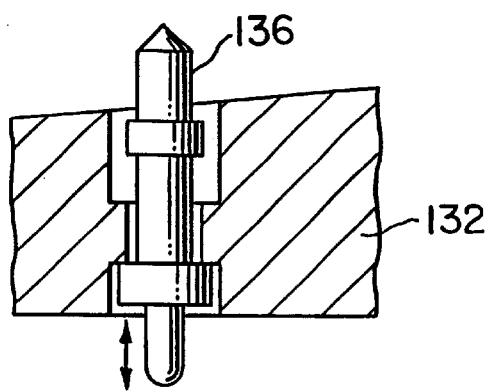

As shown in FIG. 8a, each of the spring connectors 136 has a fixed plunger at one end thereof and a movable plunger at the other end thereof, and is movably mounted on the oscillating member 132 so as not to be released in the axial direction thereof. In each of the spring connectors 136 shown in FIG. 8a, the movable plunger at the other end is designed to project with the oscillation of the oscillating member 132 due to the insertion of the storage device 1A to always resiliently contact the corresponding circuit terminal portion of the circuit substrate 2.

Since the spring connectors 136 are movable with respect to the oscillating member 132 in the axial directions thereof, excessive force is no applied to the terminal portions 110 by means of the fixed plungers of the spring connectors 136 by the oscillation of the oscillating member 132, so that it is possible to prevent the terminal portions 110 from being damaged.

Figure 8B:
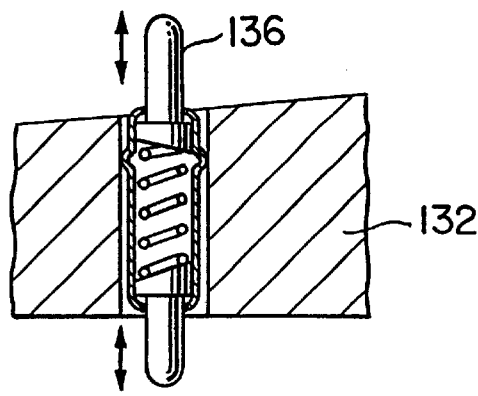

Furthermore, as shown in FIG. 8b, each of the spring connectors 136 may have movable plungers at both ends to be fixed to the oscillating member 132. In particular, in the example of FIG. 8b, the movable plungers are provided at both ends of a metal tube so as to be capable of protruding and retracting, and a coil spring is provided between both of the movable plungers. The metal tube is press-fitted into the oscillating member 132 to be fixed thereto. By the oscillation of the oscillating member 132, the movable plungers at both ends resiliently contact the terminal portions 110 of the storage device 1A and the circuit terminal portions of the circuit substrate 2, respectively, to establish the electrical connection therebetween.

Figure 9:
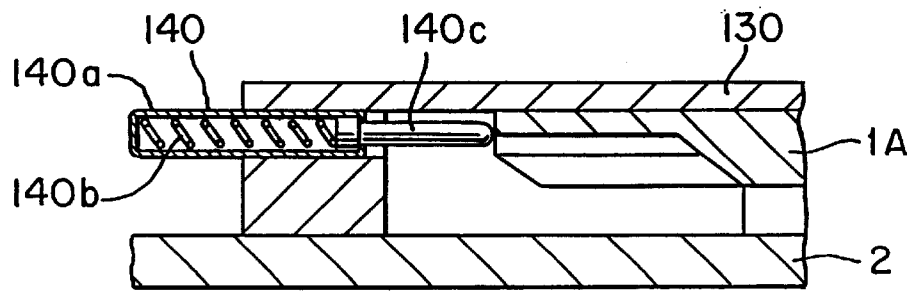

For example, as shown in FIG. 9, the spring pin 140 comprises a coil spring 140b and a protruding pin 140c, which are inserted into a metal tube 140a so as not to be removed from the metal tube 140a. With the insertion of the storage device 1A, the tip of the protruding pin 140c resiliently contacts the inserted-side end surface of the storage device 1A to be housed in the metal tube 140a against the biasing force. When the storage device 1A is ejected, the protruding pin 140c protruded by the biasing force of the coil spring 140b resiliently biases the storage device 1A in the ejected direction.

Figure 10A:
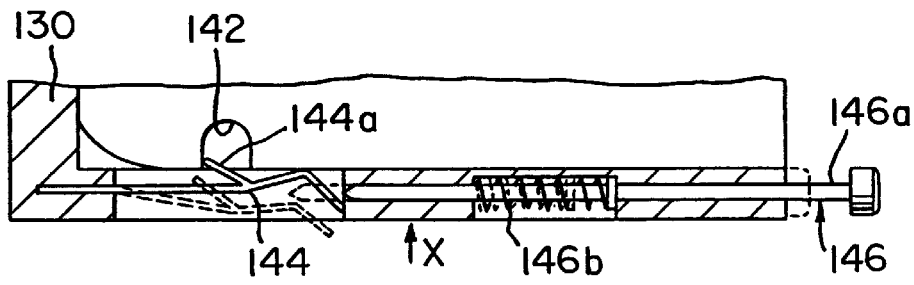
Figure 10B:
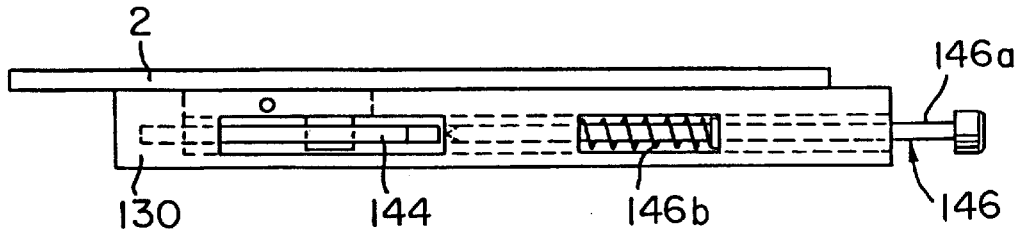

As shown in FIG. 10a, the engaging member 144 comprises a plate spring having an engaging protruding portion 144a. The engaging member 144 is resiliently deformed as shown by the broken line when the storage device 1A is inserted. When the storage device 1A is inserted to reach a predetermined position, the engaging member 144 resiliently returns to cause the engaging protruding portion 144a to engage the engaged recessed portion 142 of the storage device 1A to prevent the storage device 1A from moving in the ejected direction.

The releasing member 146 has an operating pin 146a which is movable to face the tip portion of the engaging member 144, and a coil spring 146b for biasing the operating pin 146a so as to cause the operating pin 146a to leave the engaging member 144. When the operating pin 146a of the engaging member 144 is moved toward the engaging member 144 against the biasing force of the coil spring 146b, the engaging member 144 is resiliently deformed by the tip of the operating pin 146a as shown by the broken line. By this resilient deformation, the engaging protruding portion 144a is disengaged from the engaged recessed portion 142. Then, by the biasing force of the spring pin 140, the storage device 1A is automatically moved in the ejected direction.

With the above described construction, the function of this preferred embodiment will be described below.

According to this preferred embodiment, when the storage device 1A is inserted to allow the spring connectors 136 to contact the terminal portions 110, the oscillating member 132 oscillates by the stop portion 114 of the storage device 1A to only allow the spring connectors 136 to resiliently contact the terminal portions 110 to slightly slide. In addition, the biasing force of each of the spring connectors 136 at that time varies from a very small biasing force to a predetermined large biasing force, and the mean biasing force is small. Therefore, the wearing of the terminal portions 110 is very small in comparison with conventional apparatuses wherein spring connectors slide by a long distance by a predetermined strong biasing force. In addition, metal powders are not produced by wearing. Therefore, it is possible to remarkably improve the durable number of inserting/ejecting operations.

In addition, in this preferred embodiment, the engaging member 144 does not only engage the storage device 1A to prevent the storage device 1A from moving in the ejected direction to hold the inserted state, but it also resiliently contacts the side face of the storage device 1A to cause the storage device 1A to be biased in the biased direction in the frame 130, so that the engaging member 144 has the functions of positioning the storage device 1A and preventing the backlash of the storage device 1A. In addition, since the storage device 1A is automatically protruded in the ejected direction by the biasing force of the spring pin 140 by pressing the operating pin 146a of the releasing member 146 while the storage device 1A is inserted, the operation for ejecting the storage device 1A is very easy.

Third Preferred Embodiment

Figure 12A:
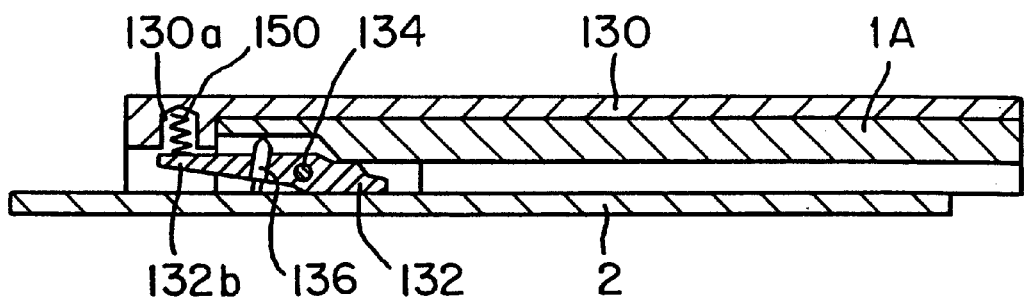
FIG. 12a is a longitudinal section of the third preferred embodiment of a terminal connecting apparatus for a storage device according to the present invention.
Figure 12B:
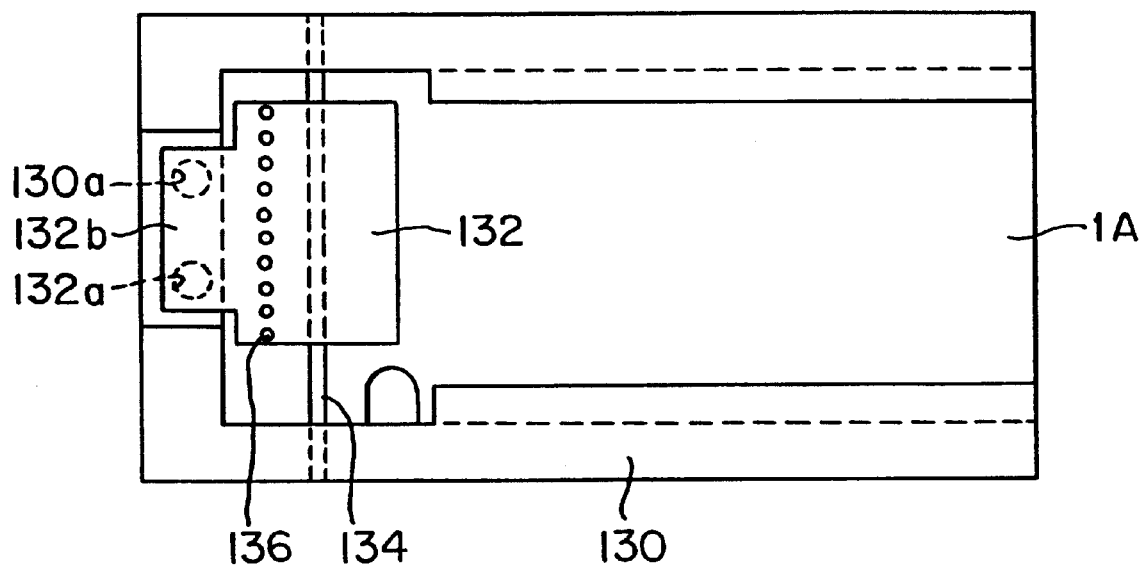
FIG. 12b is a bottom view of the terminal connecting apparatus of FIG. 12a, wherein a circuit substrate is omitted.

Referring to FIGS. 12a and 12b, the third preferred embodiment of a terminal connecting apparatus for a storage device according to the present invention will be described below. In this preferred embodiment shown in FIGS. 12a and 12b, the same reference numbers as those in the second preferred embodiment shown in FIGS. 6a through 11c are used for the same or similar members, and repeated descriptions are omitted.

In the third preferred embodiment shown in FIGS. 12a and 12b, the structure concerning an oscillating spring (resiliently biasing member) of an oscillating member 132 is different from that in the second preferred embodiment. In FIGS. 12a and 12b, the oscillating member 132 is provided with a protruding portion 132b extending from the tip on the other end side thereof (on a side, on which spring connectors 136 are provided). A spring hole 130a is formed in a frame 130 so as to face the protruding portion 132b, and an oscillating spring (resiliently biasing member) 150 is compressed to be provided in the spring hole 130a.

Also in the third preferred embodiment similar to the second preferred embodiment, the oscillating member 132 is biased by the oscillating spring 150 so that one end portions of the spring connectors 136 leave the terminal portions 110 of the storage device 1A.

In the second and third preferred embodiments, while both of the step portion 114 of the storage device 1A and the contact portion 132a of the oscillating member 132 contacting thereto have had an inclined surface to more effectively apply the wedge function, at least one may have an inclined surface. Furthermore, when the storage device 1A is not inserted, the oscillating member 132 is suitably held in a predetermined attitude for allowing the insertion of the storage device 1A.

Fourth Preferred Embodiment

Referring to FIGS. 13 through 17c, the fourth preferred embodiment of a terminal connecting apparatus for a storage device according to the present invention will be described below.

First, referring to FIGS. 17a through 17c, the construction of the storage device for use in the fourth preferred embodiment of a terminal connecting apparatus according to the present invention will be described below.

As shown in FIGS. 17a through 17c, the memory storage 1B is a relatively thin, substantially rectangular parallelepiped solid with no moving parts, and the whole storage device 1B is covered with an insulating resin. In addition, the storage device 1B has a terminal side face 212, which has a plurality of terminal portions 210, in the inserted-side portion thereof. Each of the terminal portions 210 is suitably electrically connected to a solid memory circuit or the like provided in the storage device 1B.

Referring to FIGS. 13 through 16, the construction of the terminal connecting apparatus in the fourth preferred embodiment, which uses the storage device 1B, will be described below.

First, as shown in FIGS. 15a through 16, a frame 214 of an insulating material is fixed to a circuit substrate 2. The storage device 1B can be inserted into or ejected from the frame 214 while the terminal side face 212 faces the circuit substrate 2 and while the side of a terminal portion 210 serves as an inserted side. The frame 214 has an inserting hole 216 for receiving the storage device 1B, and an oscillating member 220 of an insulating material is oscillatably provided in the inserting hole 216 on the inner side thereof.

The oscillating member 220 is pivotably supported on an oscillating shaft 218, which is parallel to the terminal side face 212 of the storage device 1B and which is perpendicular to the inserting direction thereof. As shown in FIGS. 13 and 14 in detail, a recessed portion 224 capable of receiving the inserted-side end portion of the storage device 1B is formed on one end side of the oscillating member 220. A plurality of spring connectors 226 are provided on the one end side of the oscillating member 220, on which the recessed portion 224 is formed.

The one end side of each of the spring connectors 226 is exposed from one side face 224a of the recessed portion 224 so as to resiliently contact a corresponding one of a plurality of terminal portions 210 of the inserted storage device 1B. In addition, the other end side of each of the spring connectors 226 always resiliently contact a corresponding one of the circuit terminal portions of the circuit substrate 2.

One end portion of each of the spring connectors 226 resiliently contacting the corresponding one of the terminal portions 210 serves as a fixed plunger, and the other end portion thereof resiliently contacting the circuit substrate 2 serves as a movable plunger. Each of the spring connectors 226 is movably mounted on the oscillating member 220 so as not to be released in the axial direction thereof.

An oscillating spring (resiliently biasing member) 228 is compressed to be provided between the other end portion of the oscillating member 220 and the frame 214. The oscillating spring 228 biases the oscillating member 220 in an oscillating direction so that the one side face 224a of the recessed portion 224 corresponding to the spring connectors 226 leaves the terminal side face 212 of the inserted storage device 1B.

An inclined surface 230 extending toward the opening of the recessed portion 224 is formed in the other side face 224b of the recessed portion 224 (on the opposite side to the spring connectors 226). Moreover, a parallel surface 232, which is parallel to a surface facing the inserted storage device 1B, is formed on the other side face 224b of the recessed portion 224 on the inner side of the inclined surface 230.

Referring to FIGS. 13 and 14, the operation of the oscillating member 220 will be described below.

As shown in FIG. 14, before the storage device 1B is inserted into the frame 214 to reach a predetermined position, the oscillating member 220 is biased by the oscillating spring 228 so that the spring connectors 226 leave the terminal portions 210 of the storage device 1B while the inserted-side end portion of the inserted storage device 1B contacts the inclined surface 230 of the recessed portion 224.

When the storage device 1B is inserted, the inserted-side end portion of the storage device 1B contacts and presses the inclined surface 230. Then, the oscillating member 220 oscillates against the biasing force of the oscillating spring 228 by the wedge effect of the inclined surface 230, and the one end portions of the spring connectors 226 resiliently contact the terminal portions 210 of the storage device 1B. Moreover, when the inserted-side end portion of the storage device 1B passes over the inclined surface 230 to reach the parallel surface 232, the oscillation of the oscillating member 220 is stopped, and the storage device 1B is further inserted into the recessed portion 224 as shown in FIG. 13 while the one end portions of the spring connectors 226 resiliently contact the terminal portions 210.

When the storage device 1B is inserted into a portion of the parallel surface 232 of the recessed portion 224, the terminal portions 210 of the storage device 1B slightly slide on the one end portions of the spring connectors 226 while resiliently connecting thereto. Thus, the contact portions of the terminal portions 210 and the one end portions of the spring connectors 226 are wiped. Furthermore, even if the oscillating member 220 oscillates to be in the state shown in FIG. 13, the movable plungers constituting the other end portions of the spring connectors 226 remain resiliently contacting the circuit terminal portions of the circuit substrate 2.

With the above described construction, the function of this preferred embodiment will be described below.

According to this preferred embodiment, when the storage device 1B is inserted to allow the spring connectors 226 to contact the terminal portions 210, the oscillating member 220 oscillates by the storage device 1B contacting the inclined surface 230 to only allow the spring connectors 226 to resiliently contact the terminal portions 210 to slightly slide the terminal portions 210. In addition, the biasing force of each of the spring connectors 226 at that time varies from a very small biasing force to a predetermined large biasing force, and the mean biasing force is small.

Therefore, the wearing of the terminal portions 210 is very small in comparison with conventional apparatuses wherein spring connectors slide by a long distance by a predetermined strong biasing force. In addition, metal powders are not produced by wearing. Therefore, it is possible to remarkably improve the durable number of inserting/ejecting operations.

In addition, the recessed portion 224 has the parallel surface 232 on the inner side thereof, and the spring connectors 226 are slid by a slight distance while resiliently contacting the terminal portions 210, so that it is possible to wipe the terminal portions 210 and the spring connectors 226 and to surely establish the electrical connection between the terminal portions 210 and the spring connectors 226.

Fifth Preferred Embodiment

Figure 18:
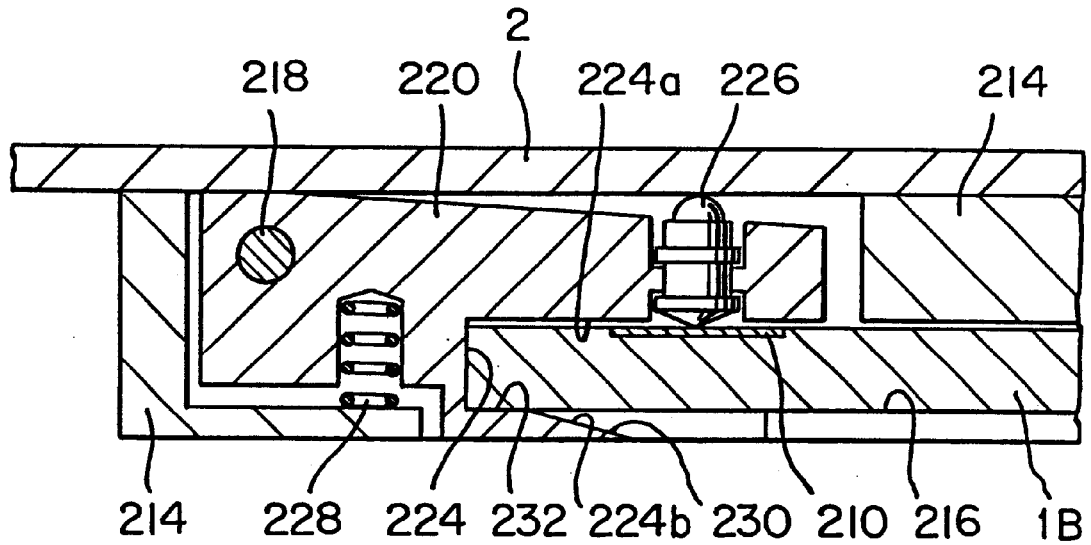
FIG. 18 is a longitudinal section of a principal part of the fifth preferred embodiment of a terminal connecting apparatus for a storage device according to the present invention, after the storage device is inserted into the terminal connecting apparatus.

Referring to FIGS. 18 and 21, the fifth preferred embodiment of a terminal connecting apparatus for a storage device according to the present invention will be described below. In this preferred embodiment shown in FIGS. 18 and 21, the same reference numbers as those in the fourth preferred embodiment shown in FIG. 13 through 17c are used for the same or similar members, and repeated descriptions are omitted.

In the fifth preferred embodiment shown in FIGS. 18 through 21, the structure concerning an oscillating spring (resiliently biasing member) of an oscillating member 220 is different from that in the fourth preferred embodiment. That is, in this preferred embodiment, an oscillating spring (resiliently biasing member) 228 provided on an oscillating member 220 is arranged on the same side of a recessed portion 224 provided on an oscillating axis 218.

Figure 19:
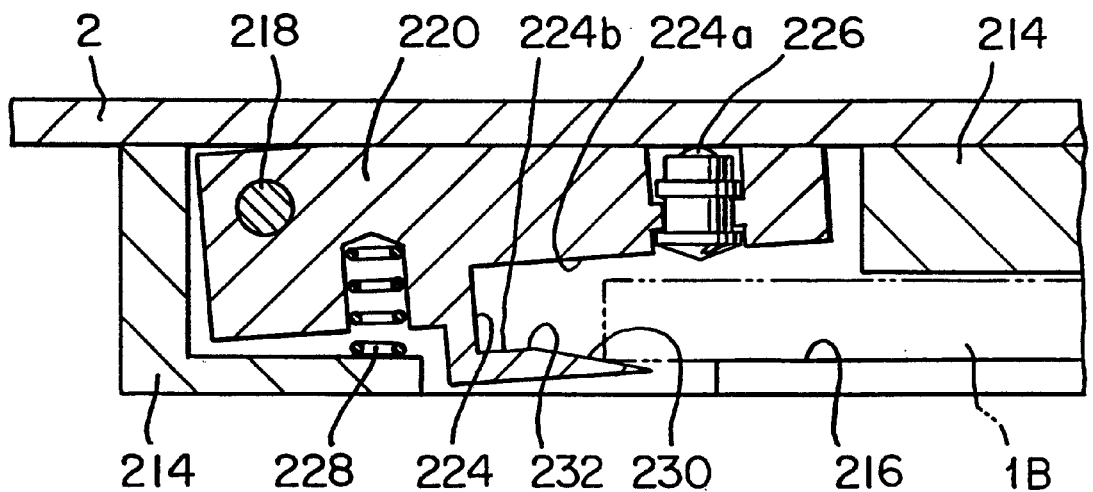
FIG. 19 is a longitudinal section of the principal part of the terminal connecting apparatus of FIG. 18, before the storage device is inserted into the terminal connecting apparatus.
Figure 22:
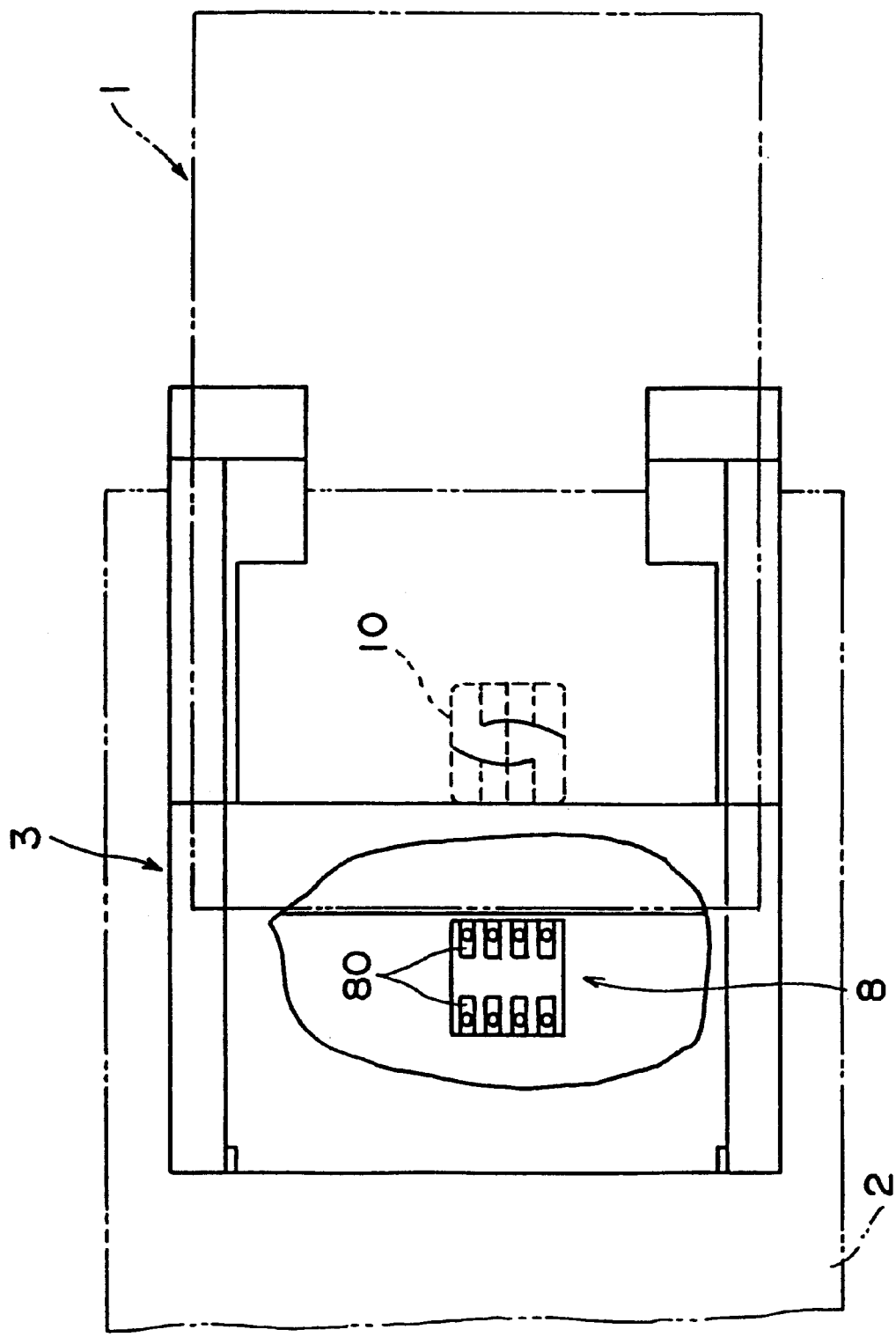
FIG. 22 is a partially broken plan view of a conventional terminal connecting apparatus for a storage device.
Figure 23:
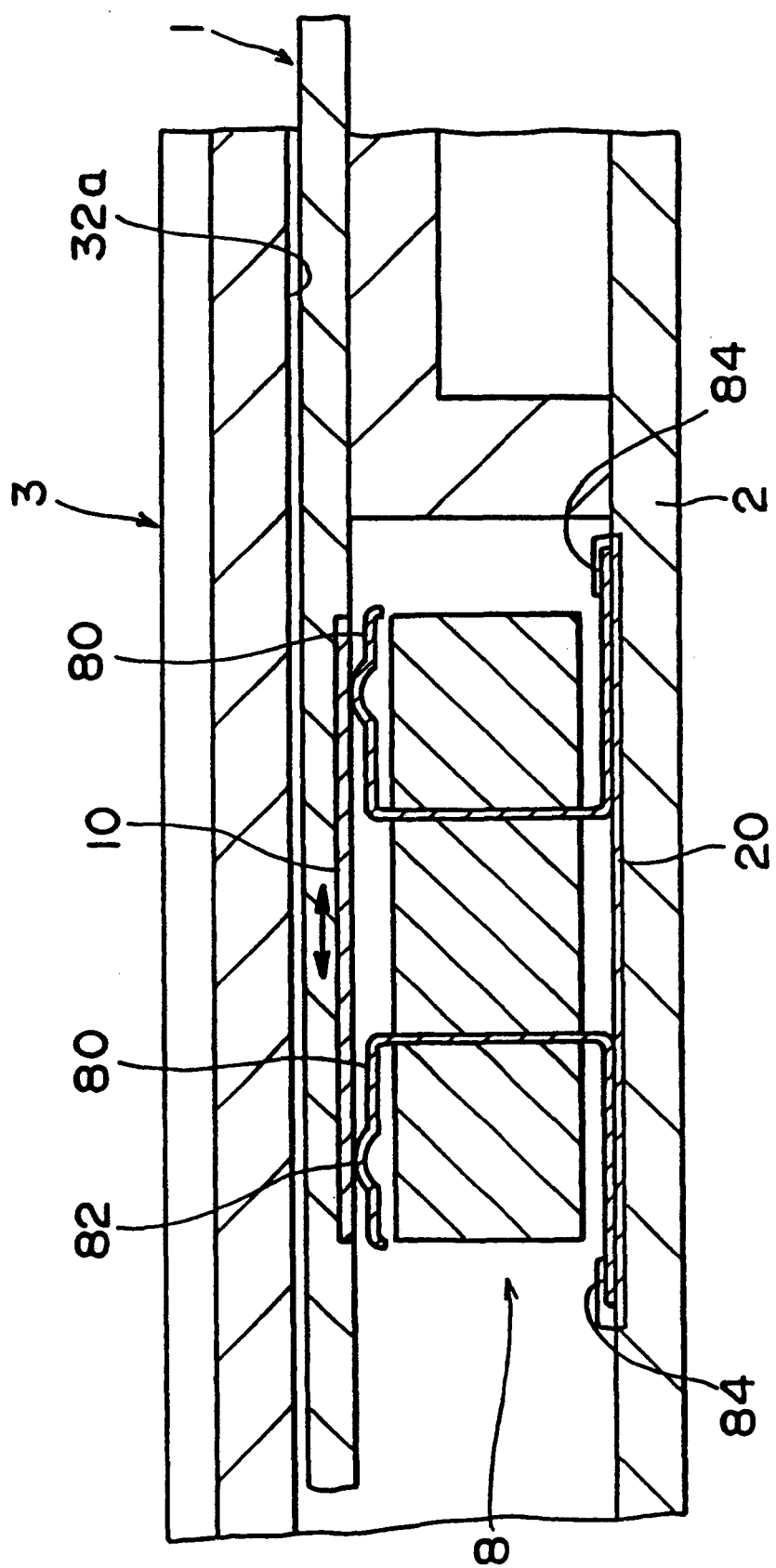
FIG. 23 is a longitudinal section of a principal part of the conventional terminal connecting apparatus of FIG. 22, after the storage device (card) is inserted into the terminal connecting apparatus.

In addition, as shown in FIGS. 18 and 19, a part of a frame 214 extends below the oscillating member 220 at a position facing the oscillating shaft 218. Between the part of the frame 214 extending downwards and the oscillating member 220, the oscillating spring 228 is compressed to be provided. Also in the fifth preferred embodiment similar to the fourth preferred embodiment, the oscillating member 220 is biased by the oscillating spring 228 in an oscillating direction so that one side face 224a of the recessed portion 224 corresponding to the spring connectors 226 leaves the terminal side face 212 of the inserted storage device 1B.

As can be seen from FIGS. 20a through 20c, in the fifth preferred embodiment, the length of the oscillating member 220 in the inserting direction of the storage device 1B can be shorter than that in the fourth preferred embodiment, so that this preferred embodiment is suitable for the miniaturization of the apparatus.

Furthermore, in the fourth and fifth preferred embodiments, the other side face 24b of the recessed portion 224 of the oscillating member 220 may be an inclined surface 230 (without providing a parallel surface 232). In this case, when the inserted-side end portion of the storage device 1B contacts the inclined surface 230 to oscillate the oscillating member 220 to cause the spring connectors 226 to resiliently contact the terminal portions 210, the storage device 1B is inhibited from being further inserted into the recessed portion 224. In addition, both ends of each of the spring connectors 226 may have a movable plunger.

In any one of the above described preferred embodiments, the resiliently biasing member for resiliently biasing the oscillating member should not be limited to the oscillating spring having the above described structure. In addition, the resiliently biasing member should not be limited to the spring member for biasing the oscillating member. The resiliently biasing member may be any one of resilient or elastic members, such as rubbers, as long as it can bias the oscillating member in a desired oscillating direction.

In addition, in any one of the above described preferred embodiments, while the frame has been fixed to the circuit substrate 2 and while the terminal portions of the storage device has been electrically connected to the circuit terminal portions of the circuit substrate 2 via the spring connectors, the present invention should not be limited thereto. That is, connection members, such as flexible cables and flexible circuit substrates, may be connected to the other ends of the spring connectors without the need of the circuit substrate 2 fixed to the frame, to be electrically connected to a predetermined circuit or the like.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A terminal connecting apparatus for a storage device having a terminal side face, on which a terminal portion is formed, said terminal connecting apparatus comprising:

a frame for receiving said storage device;

a conductive connecting member having a first end portion for contacting said terminal portion of said storage device; and a moving mechanism, mounted on said frame, for moving said first end portion of said connecting member toward said terminal portion of said storage device with the insertion of said storage device into said frame, wherein said moving mechanism has an oscillating member which is mounted on said frame so as to be oscillatable about an oscillating axis extending in a direction parallel to said terminal side face of said storage device and perpendicular to an insert-direction of said storage device, wherein the oscillation about said axis occurs due to engagement of said storage device with said oscillating member during insertion of said storage device, and wherein said first end portion makes electrical contact with said terminal portion and said oscillating member stops oscillating when said storage device makes contact with a stop surface of said oscillating member.

2. A terminal connecting apparatus as set forth in claim 1, which further comprises a circuit substrate, which is mounted on said frame and which has a circuit terminal portion corresponding to said terminal portion of said storage device, wherein a second end portion of said connecting member always resiliently contacts said circuit terminal portion of said circuit substrate.

3. A terminal connecting apparatus as set forth in claim 1, wherein said moving mechanism has a holding member for holding said connecting member, said oscillating member having a first end side connected to said holding member, and a second end side corresponding to an inserted-side end portion of said storage device, and wherein said second end side of said oscillating member is pressed by said inserted-side end portion of said storage device with insertion of said storage device into said frame, so that said first end side of said oscillating member oscillates so as to approach said terminal side face of said storage device.

4. A terminal connecting apparatus as set forth in claim 1, wherein said terminal side face of said storage device has said terminal portion on an inserted-side end portion thereof, and a step portion behind said terminal portion with respect to said insert-direction of said storage device, said step portion having a thickness greater than that of said terminal portion, said oscillating member having a first end side corresponding to said step portion of said storage device, and a second end side holding said connecting member, and wherein said first end side of said oscillating member is pressed by said step portion of said storage device with the insertion of said storage device into said frame, so that said second end side of said oscillating member oscillates so as to approach said terminal side face of storage device.

5. A terminal connecting apparatus as set forth in claim 4, which further comprises a resiliently biasing member for biasing said oscillating member in an oscillating direction so that said second end side of said oscillating member leaves said terminal side of said storage device.

6. A terminal connecting apparatus as set forth in claim 4, wherein an inclined surface for oscillating said oscillating member by the wedge effect is formed on at least one of:
   (a) said step portion of said storage device, and
   (b) said first end side of said oscillating member.

7. A terminal connecting apparatus as set forth in claim 1, wherein said oscillating member has a first end side, on which a recessed portion capable of receiving an inserted-side end portion of said storage device is provided and which holds said connecting member, said recessed portion on said first end side having one side face, to which said one end portion of said connecting member is exposed, and a second side face, on which an inclined surface extending toward an opening of said recessed portion is formed.

wherein said inclined surface of said recessed portion is pressed by said inserted-side end portion of said storage device with the insertion of said storage device into said frame, so that said first side face of said recessed portion oscillates so as to approach said terminal side face of said storage device.

8. A terminal connecting apparatus as set forth in claim 7, which further comprises a resiliently biasing member for biasing said oscillating member in an oscillating direction so that said first side face of said recessed portion leaves said terminal side face of said storage device.

9. A terminal connecting apparatus as set forth in claim 7, wherein said second side face of said recessed portion of said oscillating member has a parallel surface which is parallel to a corresponding surface of said inserted storage device on an inner side of said inclined surface.

10. A terminal connecting apparatus as set forth in claim 1, wherein said connecting member is spring connector.

11. A terminal connecting apparatus as set forth in claim 1 or 10, which further comprises a circuit substrate, which is mounted on said frame and which has a circuit terminal portion corresponding to said terminal portion of said storage device, wherein a second end portion of said connecting member always resiliently contacts said circuit terminal portion of said circuit substrate.

12. A terminal connecting apparatus as set forth in claim 10, which further comprises a circuit substrate, which is mounted on said frame and which has a circuit terminal portion corresponding to said terminal portion of said storage device, wherein a second end portion of said connecting member always resiliently contacts said circuit terminal portion of said circuit substrate.

13. A terminal connecting apparatus as set forth in claim 10, wherein said moving mechanism has a holding member for holding said connecting member, said oscillating member having a first end side connected to said holding member, and a second end side corresponding to an inserted-side end portion of said storage device, and wherein said second end side of said oscillating member is pressed by said inserted-side end portion of said storage device with the insertion of said storage device into said frame, so that said first end side of said oscillating member oscillates so as to approach said terminal side face of said storage device.

14. A terminal connecting apparatus as set forth in claim 10, wherein said terminal side face of said storage device has said terminal portion on an inserted-side end portion thereof, and a step portion behind said terminal portion with respect to said insert-direction of said storage device, said step portion having a thickness greater than that of said terminal portion, said oscillating member having a first end side corresponding to said step portion of said storage device, and a second end side holding said connecting member, and wherein said first end side of said oscillating member is pressed by said step portion of said storage device with the insertion of said storage device into said frame, so that said second end side of said oscillating member oscillates so as to approach said terminal side face of said storage device.

15. A terminal connecting apparatus as set forth in claim 14, which further comprises a resiliently biasing member for biasing said oscillating member in an oscillating direction so that said second end side of said oscillating member leaves said terminal side face of said storage device.

16. A terminal connecting apparatus as set forth in claim 14, wherein an inclined surface for oscillating said oscillating member by the wedge effect is formed on at least one of:
   (a) said step portion of said storage device, and
   (b) said first end side of said oscillating member.

17. A terminal connecting apparatus as set forth in claim 10, wherein said oscillating member has a first end side, on which a recessed portion capable of receiving an inserted-side end portion of said storage device is provided and which holds said connecting member, said recessed portion on said first end side having one side face, to which said one end portion of said connecting member is exposed, and a second side face, on which an inclined surface extending toward an opening of said recessed portion is formed, wherein said inclined surface of said recessed portion is pressed by said inserted-side end portion of said storage device with the insertion of said storage device into said frame, so that said first side face of said recessed portion oscillates so as to approach said terminal side face of said storage device.

18. A terminal connecting apparatus as set forth in claim 17, which further comprises a resiliently biasing member for biasing said oscillating member in an oscillating direction so that said first side face of said recessed portion leaves said terminal side face of said storage device.

19. A terminal connecting apparatus as set forth in claim 17, wherein said second side face of said recessed portion of said oscillating member has a parallel surface which is parallel to a corresponding surface of said inserted storage device on an inner side of said inclined surface.

* * * * *